Patented Jan. 16, 1934

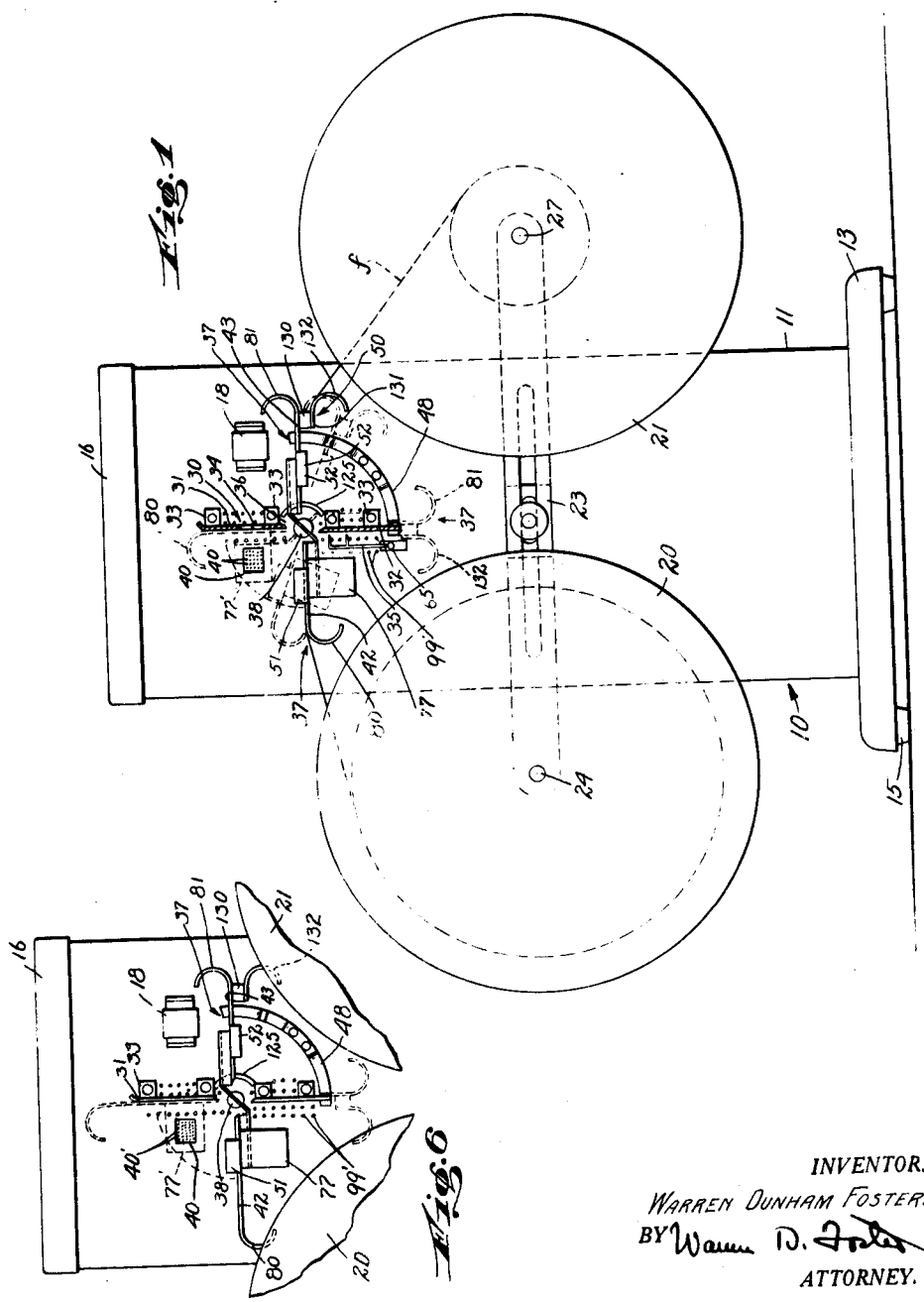

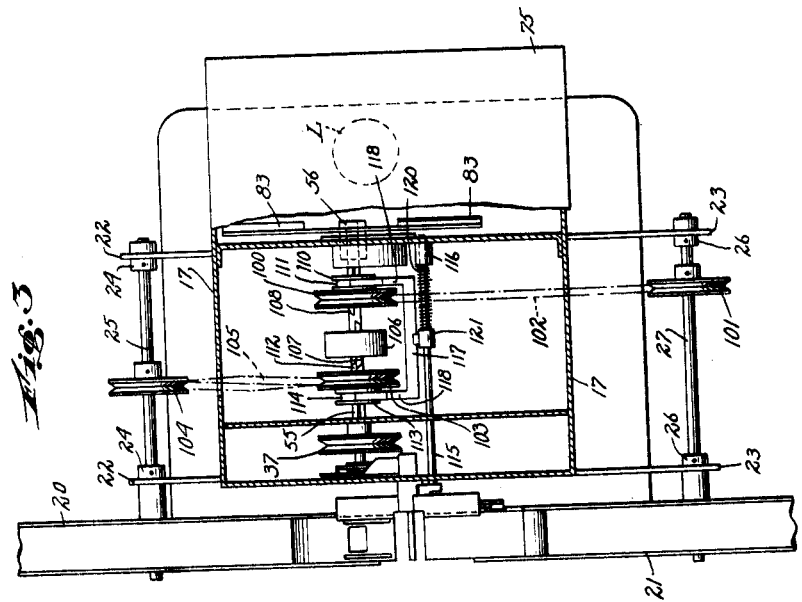

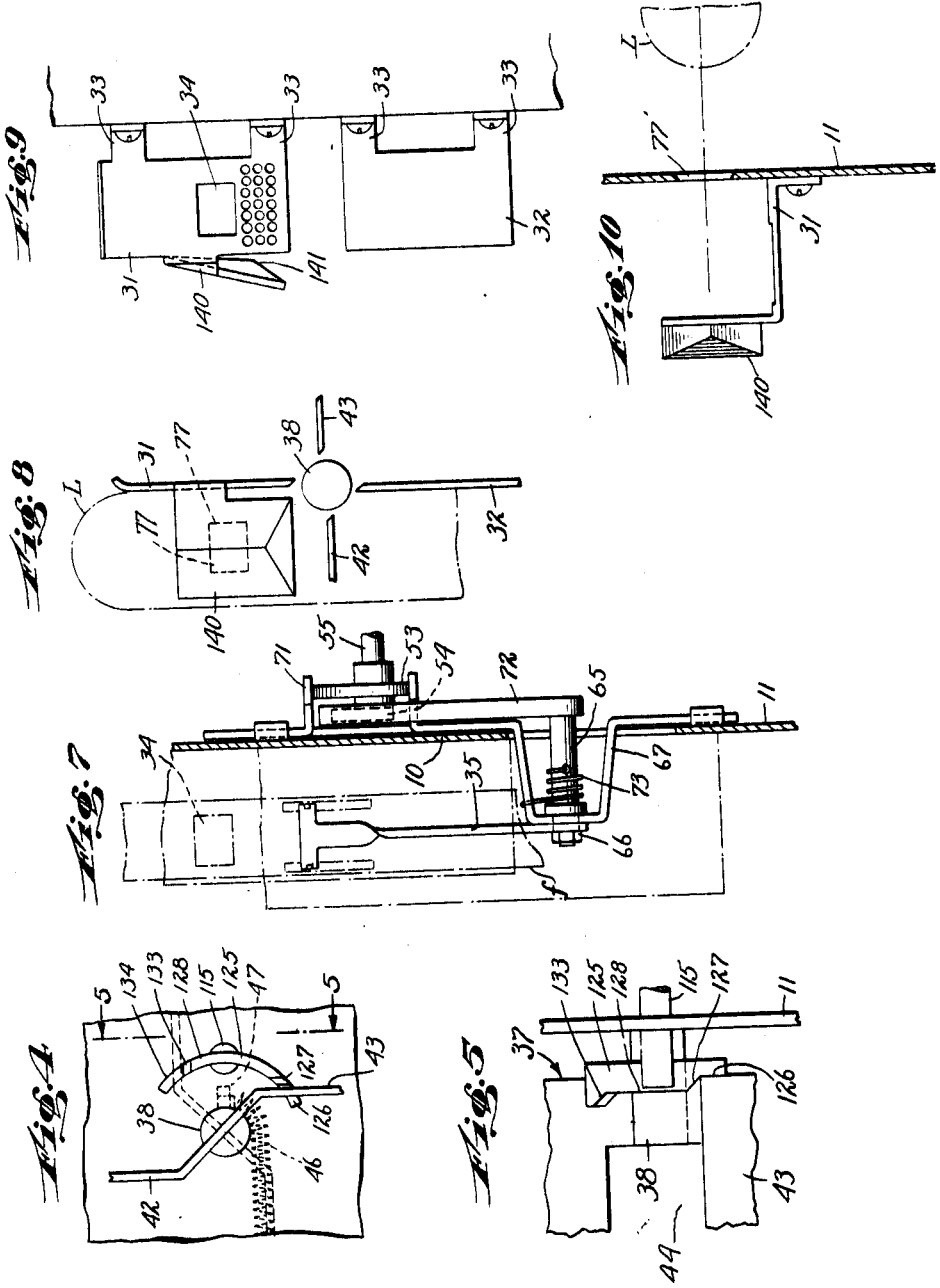

1,944,029

UNITED STATES PATENT OFFICE 1,944,029

FILM HANDLING APPARATUS

Warren Dunham Foster, Washington Township, Bergen County, N. J., assignor to Kinatome Patents Corporation Application May 26, 1932. Serial No. 613,663

25 Claims. (Cl. 88—17)

This invention relates generally to film handling apparatus and more particularly to cinematographic apparatus such as motion picture projectors and cameras, whether for the projection of or exposure to visibile images alone, or images representing sound.

One object of the present invention is to provide an inexpensive motion picture apparatus in which the film is threaded through the apparatus quickly and easily along an approximately direct path from the delivery reel to the take up reel.

Another object of the invention is to provide simple inexpensive and easily operated means in a motion picture apparatus for rewinding the film from the take up reel to the delivery reel.

Another object of the invention is to provide simple easily operated means for creating a substantially direct film rewinding path between the take up reel and the delivery reel. Still another object is to provide means for automatically beginning the rewinding operation upon and by the creation of the film rewinding path between the take up and the delivery reels.

Another object is to provide a motion picture apparatus having simple and inexpensive means for feeding the film through the apparatus without using the conventional loops, which are often sources of trouble, especially to amateurs.

It is another object of the invention to provide a motion picture projector mounted on a frame having two parallel upright mounting plates, substantially all of the operative parts of the projector being mounted between said plates out of sight and out of reach of curious persons, such as children. It is a further object of the invention to provide means for decreasing the noise of operation of the operative parts mounted between said mounting plates.

It is a further object of the invention to provide a single and improved cooling system for a gate, a motor and a lamp of a motion picture projector. It is a feature of the invention to operate said cooling system by air impelling surfaces formed upon the blades of the optical shutter, which I show as positioned within the lamp house between the lamp and the condensing lens.

It is a further feature of the invention to cool the gate by currents of air moved by suction past the gate.

Another object of the invention is to provide means for utilizing the main sources of light of a projector for illuminating the film track when the threading of the film through the apparatus is being performed. A further object of the invention is to provide means whereby such main source of light may be used for illuminating the film track during film threading operations without danger of beams of light from said source directly reaching the eyes of the operator or spectators.

It is a further object of the invention to provide a motion picture projector having a pivotally mounted gate section movable to a position for establishing a film rewinding track between the take up reel and the delivery reel. It is another object of the invention to provide a pivotally mounted gate section having means for necessarily stripping the film from the feeding means of the projector upon the first portion of the movement of the pivoted gate section to the film threading position or to the film rewinding position.

It is another object of the invention to provide improved means for bodily removing the film from the teeth of the feeding member and to protect it therefrom, such means being controlled by improved means in timed relation to the starting and stopping of the feeding and rewinding operations.

It is a further object of the invention to provide a motion picture projector wherein several of the conventional parts are arranged to have more than one function whereby a reduction of the parts of the projector is secured and a more compact arrangement of the parts is obtained.

It is a feature of the present invention to direct the beam of light from the lamp to the usual aperture in the gate through a prism or mirror supported on the pivotally mounted gate section whereby movement of the pivotally mounted gate section to open position automatically protects the film from the heat of the motor by moving the prism or mirror out of cooperative relation with the lamp.

Another important feature of the invention resides in the provision of means for cooperation with the movable gate section for controlling the film rewinding operation. According to this feature, movement of the gate from film feeding position to a position wherein it establishes a film rewinding path automatically connects the rewinding reel with the motor and disconnects the take-up reel from the motor. It is a further feature of the invention to provide means whereby the pivotally mounted gate may be moved to a convenient film threading position and while therein renders both reels inoperative. Another purpose of the invention is to provide simple and inexpensive control mechanism for the feeding and rewinding clutches directly operated by the movement of the movable gate sections.

It is a further feature of the invention to mount resistance for the lamp in the path of the air currents which cool the lamp so that these air currents are slightly warmed before reaching the lamp so that it will not be suddenly chilled.

Another feature of my invention resides in the arrangement of means on the movable gate section for maintaining a desired condition of tension in the film as it is fed without the conventional loops through the apparatus whereby the tension creating means also serve other useful purposes while the film is being rewound.

In carrying out my invention in a preferred form illustrated and described hereby I may provide a frame having two upright mounting plates spaced a short distance apart. On the front of said mounting frame I mount the delivery reel, the take up reel, the gate and an intermittent film moving member. The gate is disposed in an upright position between the reels and has a centrally pivoted offset section mounted on an axle intermediate the ends of the fixed gate section which is offset for cooperation with the movable section as will hereinafter appear. A motor and mechanism for alternatively driving the two film reels by the motor is mounted between the plates, as is also improved mechanism for driving the intermittent feeding member. The movement of the pivoted gate section automatically strips the film from the feeding member and operates the clutches which control the take up and rewinding spindles. A lamp is mounted on the rear of the mounting plate. Light from the lamp is directed to the aperture of the gate by a prism mounted upon the movable gate section so that the film is automatically protected from the heat of the light source and auxiliary light, suitably directed, provided to assist the operator upon the movement of the movable gate section to the rewinding or threading positions. The lamp-house is cooled and cool air drawn over the motor by means of air impelling surfaces formed on the blades of the optical shutter, which is placed in the lamp house, between the lamp and the condenser. Thus it will be seen that I provide a simply threaded projector with automatic rewinding at a minimum cost, and with a minimum of parts.

An additional object of the invention is the provision of improved film feeding mechanism. The accompanying drawings which constitute a part of this specification disclose one form of my invention for illustrative purposes, but it will be understood that the various features of my invention may be embodied in other forms differing from those shown in the drawings without departing from the spirit of my invention or the scope of any broader claims.

Figure 1 is a partial front view of a motion picture projector embodying one type of my invention.

Figure 2 is a side view, broken away in part, of the structure shown in Figure 1.

Figure 3 is a partial top view of the structure shown in Figure 1.

Figure 4 is a detail view to an enlarged scale showing the pivoted gate section and a cam member operated by the gate section and controlling the take-up and rewinding means.

Figure 5 is a partial cross section taken along the line V—V of Figure 4 looking in the direction of the arrows.

Figure 6 is a detail view showing a gate structure similar to that disclosed in Figure 1 and arranged to form a bridge or definitely established path for the film all the way between the two reels when the gate is disposed in rewinding position.

Figure 7 is a detail view showing a preferred construction of mechanism for operating the film feeding member of the invention.

Figures 8 and 9 are fragmentary front and side views of a gate which is similar to the gate shown in Figures 1 and 2 illustrating a preferred means for utilizing the main source of light of the projector for illuminating the adjacent portions of the film path, as during the film threading or rewinding operations.

Figure 10 is a top view of the structure of Figure 9.

In carrying out the present invention I prefer to mount the apparatus on a frame generally designated as 10, which may include a front mounting plate 11, and a rear mounting plate 12 spaced away from the front plate. The frame 10 may rest on a base 13 and be fastened thereto in any suitable way as by having the plates 11 and 12 formed with inturned flange members 14 which may be fastened to the base 13 in any well known way. The base may rest on usual soft feet 15 and in some cases for reducing manufacturing costs and weight, the base 13 and feet 15 may be omitted and the flange 14 may be turned outwardly and made long enough to serve as a base for the frame 10. The opening between the top edges of the plates 11 and 12 is preferably closed by a suitable cover plate 16 and the openings between the side edges of the plates 11 and 12 are preferably closed by suitable wall members 17. A usual objective lens 18 may be mounted on the plate 11 for cooperation with a gate structure to be presently described.

I prefer to mount a delivery reel 20 and a take up reel 21 on the frame 10 by means of extensible paired bracket plates 22 and 23 respectively. In the bracket plates 22 there may be fastened bushings 24 in which a delivery reel spindle 25 may be mounted. In the bracket plates 23 there may be fastened bushings 26 in which the take up reel spindle 27 may be mounted. For fastening the paired bracket plates 22 and 23 on the frame 10 for lateral adjustment, rectangular shaped channels 28 may be formed in the mounting plates 11 and 12 and means such as are described and claimed in my co-pending application Serial Number 613,662, filed concurrently herewith may be employed for cooperation with the above noted bracket plates and channel to fasten the bracket plates securely on the frame 10. It can be readily seen as the description proceeds that certain features of my invention may be employed with a delivery reel and a take up reel not mounted in the same horizontal plane.

For guiding a film f from the delivery reel 20 to the take up reel 21 past a source of light to be described hereinafter, I prefer to position a gate between the reels and above a line joining the axes of the reels and for reasons presently to appear a fixed section generally designated as 30 is positioned in an upright plane. The fixed gate section 30 includes an upper portion 31 and a lower portion 32 slightly offset from the upper portion so that as viewed in Figure 1 the left face of the upper portion 31 and the right face of the lower portion 32 may define the work path of the film through the gate, and may be relieved in a usual way. The upper and lower portions of the fixed gate section are fastened securely to the mounting plate 11 by flange elements 33 integral with the gate portions and riveted to the mounting plate. The upper gate portion 31 may have an aperture 34 and the lower gate portion may have suitable openings for receiving a film feeding claw member 35. In order that the film may pass from the upper gate portion 31 to the lower gate portion 32 without bending, a portion of the fixed gate section 30 is cut away at 36.

For cooperation with the fixed gate section, I employ a movable gate section generally designated as 37 which preferably is pivotally mounted on a stub shaft 38 which may be journalled in a bushing 39 firmly fastened in the plate 11 opposite the cut-out portion 36. For a purpose to presently appear, a blade or shield 40 having many closely spaced small holes 40' therethrough may be fastened on the stub shaft 38 by means of a hub 41 for movement with the gate section 37. See Figure 2.

The movable gate section 37 includes an upper portion 42 arranged to engage squarely against the upper fixed gate portion 31 and a lower offset gate portion 43 arranged to engage squarely against the lower fixed gate portion 32. The movable gate section 37 may be fastened on the shaft 38 as described in my above mentioned co-pending application, Serial Number 613,662, filed concurrently herewith. The movable gate section 37 has a cut-out portion 44 to correspond with the cut-out portion 36 in the fixed gate section so that a film may pass readily from the upper part of the gate 30 to the lower part thereof.

In its film feeding position, the movable gate section 37 is disposed against a fixed gate section 30, as indicated by the dotted line representation of the movable gate section in Figure 1, and the same is urged against the fixed gate section by a spring 46 (Figure 4), one end of which may be fastened to a pin 47 mounted in the shaft 38 and the other end may be fastened to the plate 11.

To accomplish one important object of my invention, which is to provide means for easy threading of the film from the reel 20 through the gate to the take up reel 21, there is provided a pivotal mounting for the movable gate section so as to permit the upper portion of this gate section to be swung downwardly to the left (as shown in Figure 1) to a film threading position intermediate the upright film feeding position and the lower film rewinding position (shown in solid line). Preferably when in the film threading position, the upper portion of the movable gate section 37 is disposed as indicated in the dotted line position shown in Figure 1, a small number of degrees in angular measurement above the rewinding (full line) position of Figure 1. To latch the movable gate section 37 in its film threading position, as well as in the rewinding and projecting position, a suitable detent device 48 may be mounted on the plate 11 for engagement with the inner edge of the lower gate portion 43. The detent device 40 may, if preferred, be mounted on the fixed gate section.

The outer end of each of the upper and lower movable gate portions 42 and 43 respectively has a substantially semi-circular form (as shown in Figure 1) for purposes presently to appear. To thread the film $f$ through my improved offset centrally pivoted gate, it is only necessary to draw the leading end of the film from the delivery reel 20 over the upper side of the upper gate portion 42, thence along the under side of the lower gate portion 43 between the same and a stripper or protective member 50 to be further described hereinafter and thence to the take-up reel 21.

It will be noted that the film is thus led along an approximate direct path from the delivery reel to the take-up reel in the first part of the film threading operation. To complete the threading of the film, it is only necessary to release the movable gate section 37 from the detent 48 and the spring 46 will then swing the gate section clock-wise and carry with it the film, a portion of which will be moved up against the upper portion of the fixed gate section 31, and another portion of the film will be moved downwardly (as viewed in Figure 1) against the lower portion 32 of the fixed gate section wherein it is in position to be engaged by the intermittent feeding member 35. A pair of integral lugs 51 may be bent up (as viewed in Figure 1) from each side edge of the upper gate portion 42 and a pair of integral lugs 52 may be bent down (as viewed in Figure 1) from each side edge of the lower gate portion 43 and these lugs 51 and 52 are thus effective to help hold the film in place against the movable gate section as it swings the film against the fixed gate section 31 and 32. A suitable presser pad (not shown) may be mounted on the gate for cooperation with the film in a well known way. The structure of my improved gate is described more specifically and is claimed per se in the co-pending application of Warren Dunham Foster and Frederick Davenport Sweet, Serial Number 613,600 filed concurrently herewith.

For reciprocating the feeding member 35 means may be provided which in some respects are an improvement upon the structure shown in the co-pending application of Barton A. Proctor, Serial Number 332,296 filed June 14, 1929. Such driving means for the feeding member 35, as is clearly shown in Figure 7, may include a cam 54 mounted on a main operating shaft 55 which may be journaled in a bushing 56 fastened in the rear mounting plate 12 and in another bushing (not shown) which may be of usual construction and be fastened in the front mounting plate 11. For revolving the shaft 55, a pulley 57 may be mounted thereon and connected by a belt 58 to a pulley 60 mounted on a shaft 61 of a motor 62 which preferably is mounted in a way to be described hereinafter on the rear mounting plate 12.

In accordance with that object of my invention which is to provide means for disposing most of the operating parts of the apparatus between the mounting plates 11 and 12 out of sight and out of reach of careless persons and children, for example, I prefer to employ the following described mechanism for operating the claw member 35. The lower end of the claw member may be fastened tightly on one end of a short rock shaft 65 (Figure 7) for movement angularly, and up and down with the same. The shaft 65 may be rotatably mounted in a bushing 66 fastened in an integral knob or boss 67 formed on the body portion of a carriage 68 which may be constructed similarly to and mounted in the same manner as a carriage disclosed in the above co-pending application of Barton A. Proctor, Serial Number 332,296. To permit up and down movement of the knob 67, an over-size opening 70 is provided in the plate 11 through which the knob extends. The carriage 68 has two integral cam follower lugs 71, one lug being disposed on each side of shaft 55 and the cam 53 (see Figure 7) is arranged for cooperation with the lugs 51 to move the carriage 68 up and down. Fastened securely on the inner end of the shaft 65 is a cam follower arm 72 arranged for operative engagement with the cam 54. A spring 73 on the rock shaft 65 is effective normally to hold the cam follower 72 in engagement with the cam 54.

It can be seen from inspection of Figure 7 and consideration of the above description and the disclosure of the above noted co-pending application of Barton A. Proctor, Serial Number 332,296, that revolution of the shaft 55 will cause the claw member 35 to be reciprocated for intermittently feeding the film in a usual way. In most cases, it is preferred to provide a suitable inexpensive metal cover member 74, which substantially conceals the claw member 35 and the extension 67 of the reciprocating carriage.

To cooperate with the film at the aperture 34, a lamp L is mounted in a lamp-house 75 fastened on the rear side of the mounting plate 12 and a condensing lens 76 is preferably mounted over an opening in the rear mounting plate 12 on the opposite side of the same from the lamp. A prism or mirror 77 is mounted on the upper movable gate portion 42 opposite the aperture 34 for reflecting light from the lamp L through the film. A suitable opening 77' is left in the front plate 11 opposite the prism 77 so that light may reach the prism. Guard means may be provided between the prism or mirror and the mounting plate 11 to prevent the escape of stray rays of light, or the gate may be positioned relatively closely to the plate 11.

Since it is desired in practicing my present invention to omit the conventional loops which often give trouble, as well as decrease the life of the film, especially to amateurs, there are provided other means than unsupported loops of slack film for compensating for the difference in the character of the film movement. For this purpose, I prefer to make use of tension control methods of film feeding, such as are disclosed in the co-pending application of Bundick & Proctor, Serial Number 44,482 filed July 18, 1925. It is a feature of my invention to mount resilient film tensioning devices on the movable gate section 36 so that these devices may also serve other purposes in cooperation with other parts of the apparatus besides compensating for the difference in the character of film movement. In accordance with this feature, the upper end 80 of the upper movable gate portion 42 is curved toward the delivery reel 20 and is made sufficiently resilient to maintain satisfactory tension in the film between the delivery reel and the gate and to provide the auxiliary feeding function of said Bundick and Proctor system of feeding. Likewise the lower end 81 of the lower movable gate portion is curved toward the take up reel 21 and is made suitably resilient for film tensioning and auxiliary feeding purposes. The principle of operation of the curved resilient end portions 80 and 81 are described in the above noted Bundick and Proctor application, Serial Number 44,482, and in the co-pending application of Warren Dunham Foster and Frederick Davenport Sweet, Serial Number 567,108 filed October 5, 1931 and it is not considered necessary for an understanding of the present invention specifically to explain this principle of operation herein. It is to be understood that the resilient end portions 80 and 81 may be made integral with the movable gate section 36 or as separate parts, and in either case may be relieved in a usual way. While the film is being drawn from the delivery reel 20 under tension over the curved resilient end 80, it is desirable to have the movable gate section 36 firmly held in fixed relation to the upper fixed gate section 31. To attain this end, the guide lugs 51 may be formed with a suitable irregular cross section so that they may engage the side edges of the upper fixed gate section 31 with a snap fastener action and thereby releasably latch the movable gate section 42 firmly to the fixed gate section 31. The end portion 80 when the gate section 36 is disposed in film feeding position is so positioned that it guides the film $f$ so as to clear the prism or mirror 77 as it is drawn from the delivery reel 20. Other functions of the resilient curved portions 80 and 81 will presently appear.

To cooperate with a beam of light from the lamp L and the above described intermittent feeding means, it is a feature of the present invention to mount a shutter 82 adjacent the lamp L on the rear end of the shaft 55 in compact relation to the rear mounting plate 12. Such a mounting for the shutter intercepts the beam of light before it passes through the condensing lens 76, which is desirable, as is well known to those skilled in the art. Such a mounting for the shutter 82 also affords an additional advantage in that the blades of the shutter may be made with integral fan elements 83 so formed as to blow air currents around the lamp L and thereby cool it. As will presently appear, the currents of air from the fan element 83 may be so drawn into the lamphouse 75 as to be heated before they engage the lamp. A protective wire netting or grill (not shown) may be fastened in the lamp housing 75 just to the right of the fan elements 83, if desired.

In accordance with that purpose of my invention to provide a quiet motor-driven operating means for a film handling apparatus, I prefer to mount the motor 62, on the rear mounting plate 12 by the following described devices. A fibre plate 84 may be fastened by screws 85 to the rear mounting plate 12 and screws 86 which have their heads 87 countersunk in the fibre plate. may extend through mounting blocks 88 of the motor 62 and through the frame of the motor; and nuts 90 screwed on the ends of the screws 86 hold the mounting blocks 88 tightly against a stiff metal bearing plate 89 interposed between the blocks 88 and the fibre plate 84. The motor shown in Figure 2 is an induction type of motor of well known construction, but other types of motors may be used and mounted in suitable ways for securing quiet operation.

In addition to the air-propelling blades 83 of the optical shutter, a fan 91 having a usual apertured fan housing 92 with air inlets 92' may be mounted on the motor shaft 61 and blow air around the motor 62, if desired. To direct air from the vicinity of the motor to the lamp L, an air control housing 93 may be arranged between the mounting plates 11 and 12 and the end walls 17 which encloses the motor 62 on all sides and includes a deflector wall 95 joined closely to the side of the fan housing 92 farthest from the motor 62. The wall 95 fits closely between the wall members 17 and extends upwardly along the mounting plate 11 to which it is connected above the gate by a leftwardly bent extension 95'. The housing 93 is fastened closely against the base 13 and the mounting plate 12 and has a roof-like top plate 96 which slopes upwardly and is fastened tightly to the mounting plate 12 just above an opening 97 provided therein through which air may pass into the lamp housing 75 adjacent the base of the lamp L. The opening 97 is preferably positioned so that the shutter fan elements 83 can suck air into the lamp-house. Should the fan 91 be omitted, a suitable deflector plate may be mounted adjacent the air inlets 92 to direct air currents against the motor 62.

It can be readily seen that the housing 93 will also function to help reduce the noise of operation of the motor 62 and fan 91, and the efficiency of this noise reducing function may be increased if desired by making the housing 93 of fibre or some other non-metallic material. Sound vibrations from the motor 62 and fan 91 are checked from passing out of the housing 93 through usual apertures or inlets 92' in the housing 92 because of the inward flow of air through such inlets. The noise of the motor may be further reduced, if desired, by lining the plate 12 with sound deadening material.

It is a feature of my invention to pre-heat the air which cools the lamp L to prevent too sudden cooling of the same, which is undesirable. To this end a resistance 98 of a usual kind for the lamp L may be mounted on the inner face of mounting plate 12 opposite the opening 96. If a transformer is employed, it may be similarly positioned. This arrangement is especially desirable since the resistance is so disposed that a careless person in manipulating the lamp L cannot be burned or shocked by the hot wires. Also, any air passing into the lamp housing 75 because of the operation of the fan 91 or the shutter fan elements 83 or both, will be slightly warmed before it reaches the lamp L. This arrangement also serves to cool the resistance. If a transformer is used in place of a resistance element, it may be placed in this draft of air as described above. Air currents may pass out of the lamp-house 75 through usual louvre openings 99 provided in the upper portions of the rear and side walls of the lamp housing. Also openings may be provided, if desired, in the top of the lamp housing. Openings with suitable closures therefor may be provided in the lamp-house 75 and in the mounting plate 12 to permit access to the parts enclosed therein and therebehind. Since the mounting plate 11 has no opening therein adjacent the fan 91, most of the air sucked in through the inlets 92 is drawn into the closed chamber between the mounting plates 11 and 12 and the walls 17 through numerous small air inlet openings 99' provided in the front 11 adjacent the gate structure. Air currents moving inwardly through the openings 99' will thus help cool the gate adjacent the aperture and be drawn downwardly along the inside face of the front mounting plate 11 and therefore tend to cool this plate and dissipate the heat conducted to it from the gate through the flange members 33. This advantageous arrangement of my lamp cooling system thus helps to prevent excessive heating of the gate and the motor as well as the lamp.

In accordance with an important object of my invention which is to provide means for rewinding the film on the delivery or rewinding reel 20, and to render both reels inoperative when the gate is moved to film threading position, I provide the following mechanism for driving the take up reel and rewinding reel. A take-up pulley 100 is loosely mounted on the shaft 55 and is connected to a pulley 101 fastened on the take-up spindle 27 by a spring belt 102 which serves also as a slip clutch. A rewinding pulley 103 is loosely mounted on the shaft 55 to the left of the pulley 100 (as viewed in Figure 3) and is connected to a pulley 104 fastened on the delivery or rewinding spindle 26 by a belt 105. Since the belt 105 revolves the reel 20 in a rewinding direction, it is desirable to give this belt a half turn as illustrated in Figure 3, or, if preferred, other direction-changing means of any known construction may be employed between the pulley 103 and the pulley 104. For alternatively connecting the take-up reel 21 and the delivery reel 20 to the shaft 55 for operation by the motor 62, a relatively thick driving plate or collar 106 may be firmly fastened to the shaft 55 between the pulleys 100 and 103 and a plurality of clutch pins 108 are fastened rigidly in the pulley 100 to project therefrom toward the collar 106 for operatively engaging the pins 107.

The pulley 100 has a hub portion 110 integral therewith and is provided with an angular groove 111. Means for moving the driven clutch pins 108 into and out of engagement with the driving clutch pins 107 will be described hereinafter. Clutch pins 112 are fastened rigidly in the pulley 103 for cooperation with the driving clutch pins 107 and a hub portion of the pulley 103 may have an angular groove 114 similar to the groove 111.

For moving the pulleys 100 and 103 alternatively into operative engagement with the collar 108, one at a time, a rod 115 may be slidably mounted in the front mounting plate 11 and extend therefrom to be slidably mounted in a bushing 116 fastened in the rear mounting plate 12. Between the plates 11 and 12, a yoke 117 is mounted on the rod 115 and may have an arm 118 arranged for engaging with a running fit in each of the grooves 111 and 114 and be curved in conformity with the curvature of the grooves and extend partly around the hub in which each groove is cut. The yoke 117 and the arms 118 are so arranged that when the rod 115 is slid to bring the clutch pins associated with either of the pulleys 100 or 103 into engagement with the clutch pins 107, the clutch pins of the opposite pulley are moved out of engagement with the clutch pin 107 a considerable distance before the pulley moving toward the collar is operatively engaged therewith. A spring 120 is disposed around the rod 115 between the hub element 121 of the yoke 118 and the bushing 116 and tends to keep the pulley 100 in operative engagement with the collar 106.

For accomplishing an important purpose of the present invention which is the provision of inexpensive, easily operated means for rewinding the film on the delivery reel 20 after it has been projected and wound on the take up reel 21, it is a feature of the invention to utilize the movable gate action 36 to create a substantially direct rewinding path for the film. It is a further purpose of the present invention to provide means whereby the operative movement of the gate section 36 to a position for establishing a rewinding path automatically actuates the film rewinding means. In accordance with these objects and features, the movable gate section 36 is so constructed and mounted that it may be swung from its upright film feeding position to a substantially horizontal position (see Figure 1) wherein it not only defines a substantially direct path for the film from the reel 21 to the reel 20, but it by means of the flange members 51 and 52 also functions to maintain the film in such direct rewinding path.

To control the rewinding of the film by the movement of the gate, the rod 115 is extended past the mounting plate 11 adjacent the path of the inner edge of the movable gate section 36 and a cam member 125 is mounted on the end of the rod 115 for engagement by the inner edge of the lower movable gate portion 43. Referring to Figures 4 and 5 it can be seen that when the gate section 36 is in upright film feeding position, the gate portion 43 is disposed closely adjacent to or against an inner dwell portion 126, which is the nearest section of the work face of the cam 125 to the yoke 117. In this position of the gate 36, the rod 115 and the yoke 117 are so disposed by the spring 120 as to maintain the pulley 100 in operative engagement with the driving collar 106. Upon a small angular movement of the gate section 36 toward open position, the inner edge of the gate portion 43 engages against a first cam element 127 of the cam 125 and moves the rod 115 to the right (as viewed in Figures 3 and 5) until the driven pins 108 in the pulley 100 are freed from the driving pins 107 in the collar 106. Shortly afterward the edge of the gate portion 43 rides upon an intermediate dwell portion 128 of the cam 125 and no further movement of the yoke 117 and the pulleys 100 and 103 occur during a large succeeding angular movement of the gate 37. It is to be noted that while the gate section 37 is in this intermediate position, neither of the reels 20 and 21 is operatively connected with the driving shaft 55 and therefore remain stationary, but the intermittent film feeding mechanism continues to be driven by the shaft 55 through the above described intermittent movement.

It is a feature of the present invention to provide mechanism necessarily operative which prevents the operation of the feeding means during this actuating movement of the gate section 37 and during the entire rewinding operation from affecting the film. To carry out this feature, the stripping element 50 is constructed as illustrated in Figures 1 and 2 so as to include a web portion 130 integrally joined to the inner edge of the lower gate portion 43 adjacent its resilient curved portion 81; a flat film stripper portion 131 disposed at right angles to the web portion 130; and a curved film guiding portion 132. The film guiding portion 132 may be made resilient, if desired. By inspection of Figure 1, it can be seen that when the movable gate section 37 is disposed in film feeding position the film stripper portion 131 is disposed to the left of the film f adjacent the same and a short distance below the film feeding member 35. Then upon a small movement of the gate section 37 toward open position the film is necessarily removed from engagement with the film feeding member 35 and protected therefrom by the film stripper portion 131, and is maintained out of reach of this feeding member while rewinding of the film is being done, or while a new film is being placed in position.

Further angular movement of the gate section 37 counter-clockwise will cause the inner cam-actuating edge of the gate portion 43 to engage a second cam element 133 of the cam 125 just before the gate section 36 reaches the solid line position of Figure 1 wherein it establishes the rewinding path for the film. Then a short final angular movement of the gate 36 will be effective through the cam 125, the rod 115 and the yoke 117 to cause the rewinding pulley 113 to become operatively engaged with the driving collar 106 whereupon the reel 20 will begin to be revolved in a rewinding direction. The detent 48 may be arranged for latching the movable gate section 36 in its film rewinding position. No further attention of the operator will be required until the film is rewound on the reel 20. If the rewinding is stopped by the operator before all of the film has been unwound from the reel 21, projection can be immediately started again, if such is desired, by swinging the movable gate section 37 to its upright film feeding position. Should it be desired to wind up all of the film on the reel 20, this can be done and the motor stopped and the lamp L extinguished by operation of a switch (not shown) which may be placed in the circuit of the motor and the lamp and be of well-known construction.

While a new reel is being put in place on the delivery reel spindle 26, the movable gate section 37 may be left in the film threading position with the motor and lamp inoperative and the film may be threaded through the gate while in this position. But if the light of the lamp L is desired for facilitating the operation of film threading, the motor and the lamp may be left connected to the source of electricity and the movable gate section moved clockwise to its film threading position before the new reel is put on the projector. As explained above, both of the reels will remain motionless as long as the gate section is held by the detent 48 in its intermediate film threading position.

It can be seen that when the movable gate section 37 is disposed in rewinding position, the resilient curved end portion 80 is disposed so that is effective for helping to relieve sudden strains should any come on the film incidental to the starting of the rewinding operation automatically.

It can also be seen that when the gate section 37 is first moved toward rewinding position, the prism or mirror 77 is moved out of operative relation to the beam of light from the lamp L and automatic protection for the film at the aperture against the heat of the lamp is thereby secured. Also, when the prism is again moved into position to deflect light and heat to the film, the same movement automatically positions the film in engagement with the feeding means which at once begin to operate.

In Figure 6 there is illustrated a slightly modified form of movable gate section 36', which is so constructed and mounted with respect to the reels 20 and 21 that it forms a complete bridge, so to speak, for the gap between the two reels for the rewinding film path.

In accordance with one of the objects of the present invention, means are provided for employing the main source of light in a film handling apparatus, such as the lamp L, to illuminate the film threading and film rewinding tracks created by disposing the movable gate section 37 in film threading and film rewinding positions. An improved feature of the present invention resides in the provision of means for accomplishing this purpose of the invention so that the light from the lamp L is prevented from shining directly in the eyes of the operator or spectator while it is being used for illuminating the film tracks between the reels. This is desirable because the concentrated bright light of the lamp L may temporarily blind the operator should it reach his eyes directly in undiminished force.

Light from the lamp L passes through the condensing lens 76 to the prism 77 and thence is deflected through the film at the aperture 34. When the movable gate section 37 is swung counter-clockwise to either its threading position or its film rewinding position, the prism 77 moves with the gate section and the beam of light from the lamp L may be arrested by a deflector member 140 secured to the upper fixed gate portion 31 and shaped as illustrated in Figures 8 and 9 and 10 so as to deflect the light downwardly and also to both the right and left along the portions 43 and 42 respectively of the movable gate section. The inner deflecting face of the deflector member 140 is preferably plated and polished in a well known way. To deflect light by the member 140 rightwardly past the fixed gate portion 31 and thence along the movable gate portion 43, part of an integral connecting portion joining the deflecting member 140 and the fixed gate portion 31 is cut away at 141. Also a plurality of small holes 142 may be provided through the lower part of the fixed gate portion 31 to permit light to pass when needed for threading or other manipulative purposes.

According to another way of accomplishing that purpose of my invention for preventing the light from the main source reaching the eyes of the operator in an objectionable way, the movable perforated shield 40 may be so mounted on the stub shaft 38 so that when the movable gate section 37 is swung to either film threading or film rewinding position, the perforated blade 40 intersects the beam of light from the lamp L and a greatly reduced amount of light therefore passes through the blade and reaches the operator's eyes. It can be seen that, if desired, the perforated blade or shield 40 can be used to cooperate with the deflector member 140, or one can be used without the other.

Certain advantages of my invention have been stated in the above portion of this specification.

Other advantages arise from the mounting of the motor on a sound deadening fibre plate fastened to the rear mounting plate 12.

Other advantages arise from arranging the mounting frame and the movable parts of the apparatus so that nearly all of the moving parts are concealed by the mounting frame. This makes possible easier and more artistic decoration of the frame of the apparatus than would be possible if most of the moving parts were in full view.

Still further advantages arise from the mounting of the movable gate section which permits it to be swung for rewinding purposes beyond, i. e. below, a horizontal rewinding position which in some cases may be desirable so that the movable gate can be disposed for film threading purposes in a substantially horizontal position.

Still other advantages arise from mounting the prism on the movable gate section whereby the film is protected from the heat of the lamp automatically when the gate is opened to any extent.

Still other advantages arise from the construction of the intermittent movement so that the film claw member may be pivotally mounted in a plane a considerable distance from the plane of the reciprocating carriage upon which the film claw is mounted.

I claim:

1. In a film handling apparatus, in combination, a delivery carrier, a take up carrier mounted adjacent said delivery carrier in substantially the same horizontal plane, a gate mounted between said carriers in a plane at substantially right angles to a line joining the axes of said carriers, said gate including a pivoted section movable from a film feeding position to a position wherein it forms a bridge as a rewinding work path from one of said carriers to the other, said bridge extending across the valley between said reels, and means for feeding the film across said bridge through such rewinding work path.

2. In a film handling apparatus, in combination, a delivery carrier, a take up carrier mounted in the same horizontal plane as said delivery carrier, means for feeding a film from said delivery carrier to said take up carrier, a gate mounted between said carriers in an upright position, said gate having a pivoted movable section, said pivoted section being movable to a position approximately at right angles to said gate for creating an approximately direct path for the film from said delivery carrier to said take up carrier, means for rotating said delivery carrier for moving the film along said direct rewinding path from said take up carrier to said delivery carrier and rewinding it thereupon, and means disposed adjacent both sides of said pivoted section for laterally guiding the film in respect thereto whereby during such rewinding operation the film is maintained in said direct rewinding path.

3. In a film handling apparatus, in combination, a delivery carrier, a take-up carrier, a gate, said gate including a fixed section and a movable section, said movable section having a pivotal mounting and being disposable in a film feeding position parallel to and against said fixed section, said film feeding position of said gate being such that the film feeding path from said delivery carrier to said take-up carrier is characterized by one or more material changes in direction, said movable gate section being movable to a position for defining a rewinding path for a film between said carriers which rewinding path forms substantially a straight line between said carriers, and means operable by the movement of said movable gate section for alternatively applying power to said take-up carrier and said delivery carrier for alternatively moving a film through said film feeding path and through said rewinding path.

4. In a film handling apparatus, in combination, a rewinding spindle, a take up spindle, film feeding means, driving means for said spindles for rotating them in opposite directions, one at a time, a gate having a pivoted section movable angularly to a large extent, upon an axis parallel to the axis of said spindles, from a film feeding work position to a film rewinding work position, the positioning of said movable gate section in one of said positions being effective to create a film work path between said spindles separate and distinct from the film work path created by the positioning of said movable gate section in the other of said positions, and instrumentalities operatively interconnecting said spindles and said movable gate section for connecting one of said spindles at a time to said driving means in accordance with the work path created by said movable gate section.

5. In a film handling apparatus, in combination, film taking up means, film rewinding means, a gate including a pivotally mounted gate section movable to a plurality of positions, a motor, and control mechanism for alternatively connecting each of said means with said motor, said control mechanism including driving and driven elements, one of which is movable into operative relation with the other, for each of said means, and cam means operatively associated with said pivoted gate section and with said elements for moving said driving and driven elements for said taking up means into operative relation with each other upon the movement of said gate section to one position and for moving said driving and driven elements for said rewinding means into operative relation with each other upon the movement of said gate section to another position.

6. In a film handling apparatus including a mounting frame having a front and rear mounting plate, in combination, a rewinding spindle on said frame, a take up spindle on said frame, feeding means, a driving shaft for said feeding means, supported between said mounting plates, a gate having a pivoted section, and means operated by said pivoted gate section for connecting one of said spindles at a time with said motor, said connecting means including a driving clutch member on said shaft, a pulley loosely mounted on said shaft associated with said rewinding spindle, a pulley loosely mounted on said shaft associated with the said take up spindle, and mechanism for shifting said pulleys one at a time into driven engagement with said driving member, said mechanism including a rod shiftably mounted on said mounting plates, and a cam on the forward end of said rod for engagement with said pivoted gate section.

7. In a film handling apparatus, in combination, a gate including a fixed gate section and a movable gate section, a rewinding carrier, a take up carrier, a motor, and means operable by movement of said movable gate section for connecting said motor with either of said carriers, said connecting means including two shiftable pulleys, one associated with each of said carriers, and pulley-shifting means operatively connected with said movable gate section and common to both of said pulleys.

8. In a film handling apparatus having a rewinding spindle and a take up spindle, in combination, a shaft, a first pulley loosely mounted on said shaft and operatively connected to said rewinding spindle, a second pulley loosely mounted on said shaft and operatively connected to said take up spindle, a driving member fastened on said shaft between said pulleys, means including clutch devices on said pulleys and on said driving member operative for connecting either of said pulleys with said driving member, a gate including a fixed section and a pivotally mounted section normally disposed in film feeding position against said fixed section and movable therefrom to a plurality of film path defining positions, and connecting means between said pulleys and said pivoted gate section operative by movement of said pivoted gate section, said connecting means being operative upon movement of said pivoted gate section to film feeding position to move said take up pulley into driven engagement with said driving member and to move said rewind pulley away from said driving member, said connecting means being operative upon movement of said pivoted gate section away from said fixed gate section to a film rewinding position to move said rewinding pulley into driven engagement with said driving member and to move said take up pulley away from said driving member, said connecting means being effective while said pivoted gate section is disposed in a film threading position to maintain both said rewind pulley and said take up pulley out of engagement with said driving member so that said spindles are inoperative while the film is being threaded through said apparatus.

9. In a film handling apparatus, in combination, an apertured openable gate including a fixed section and a section mounted for pivotal movement relatively thereto, a source of light, the axis of the aperture of said gate and the axis of the light from said source being disposed in angular relation, one to the other, means including a light deflecting device mounted for movement with said pivoted gate section from a first position wherein it creates a light path from said light source to said aperture to a second position wherein it destroys said path, film feeding means, and means for bodily removing the film from said feeding means mounted for movement with said pivotal gate section to a film removing position concomitantly with the movement of said light deflecting device to said second position whereby said film is removed from said feeding means simultaneously with the destruction of said light path.

10. In a film handling apparatus, in combination, an apertured gate, a member for feeding a film past the aperture of said gate, operable means for bodily removing the film from said member, a source of light, the axis of the aperture of said gate and the axis of the light emitted by said source being disposed in angular relation, one to the other, operable means movable from and to a position wherein it deflects light emitted by said source and directs it to said aperture, and control means operatively interconnecting said bodily removing means and said light deflecting means for operating said bodily removing means and said light deflecting means.

11. In a film handling apparatus, in combination, an apertured openable gate through which a film may be fed, a source of light, the axis of the aperture of said gate and the axis of the light emitted by said light source being disposed in angular relation one to the other, operable means for creating a light path from said light source to said aperture, a take up carrier, means for rendering said take up carrier operative for taking up the film fed through said gate, and means for operating said means for creating a light path from said light source to said aperture and for concomitantly operating said means for rendering said take up carrier operative whereby light is delivered to the film when said taking up operation begins.

12. In a film handling apparatus, in combination, an apertured gate through which a film is fed, a source of light, the axis of the aperture of said gate and the axis of the light emitted by said source being disposed in angular relation one to the other, operable means for changing the direction of light passing from said light source movable to and from an operative position wherein it directs light to said aperture whereby a light path between said source and said aperture is created, a rewinding carrier, means for operating said rewinding carrier for rewinding the film thereupon, and means operatively interconnecting said means for creating said light path and said means for operating said rewinding carrier for positioning said light-path-creating means out of said operative position while said rewinding carrier is operative whereby said light path is destroyed while said rewinding operation is being carried on.

13. In a film handling apparatus, in combination, an apertured gate, a source of light, the axis of the aperture of said gate and the axis of the light emitted by said source being disposed in angular relation one to the other, operable means for changing the direction of light from said source for directing light to said aperture whereby a light path between said source and said aperture is created, a member for feeding a film past the aperture of said gate, operable means for moving the film into driven engagement with said feeding member, and means operatively interconnecting said means for moving the film into driven engagement with said feeding means and said means for creating said light path from said light source to said aperture for operating both of the same in timed relation whereby the film is placed in driven relation with said feeding member in timed relation to the creation of the path for directing light to the film.

14. In a film handling apparatus, in combination, a mounting frame, a rotatable delivery carrier, a rotatable take up carrier, said carriers being mounted on the front side of said frame adjacent the base thereof in the same horizontal plane and in the same vertical plane, an upright apertured gate mounted on the front side of said frame above a line joining the axes of said carriers and between the same, said gate including a pivotally mounted gate section, a light source mounted on the back side of said frame, and a light deflecting element mounted on said movable gate section in the bight of said film as it passes from said delivery carrier to said gate for directing light from said source to the aperture of said gate.

15. In a film handling apparatus, in combination, a mounting frame, a revoluble delivery carrier, a revoluble take up carrier, said carriers being mounted on the front side of said frame adjacent the base thereof in the same horizontal plane and in the same vertical plane, an upright apertured gate mounted on the front side of said frame above a line joining the axes of said carriers and between the same, said gate including a pivotally mounted gate section swingable toward said delivery carrier to establish a film rewinding position, a light source mounted on the back side of said frame, and a light deflecting element mounted on said movable gate section in the bight of said film as it passes from said delivery carrier to said gate for directing light from said source to the aperture of said gate, the movement of said pivoted gate section to said rewinding position being effective to remove said light deflecting element from said bight of the film.

16. In a film handling apparatus, in combination, a source of light, an apertured gate, the axis of the aperture of said gate and the axis of said light source being angularly disposed one to the other, said gate including a fixed gate section and a section movable from and to cooperative relation thereto, and a light deflecting element for directing light from said source to the aperture of said gate, said light deflecting element being mounted on said movable gate section and movable therewith into cooperative relation to said light and the aperture in the fixed gate section upon the movement of said movable section into cooperative relation with said fixed section whereby when said movable gate section is disposed in such cooperative relation to said fixed gate section light from said source is directed to the aperture of said gate.

17. In a film handling apparatus, in combination, a source of light, an apertured gate, the axis of the aperture of said gate and the axis of said light source being angularly disposed one to the other, said gate including a fixed gate section and a section movable from and to cooperative relation thereto, a light deflecting element for directing light from said source to the aperture of said gate, a mounting for said light deflecting element, and a connection between said mounting and said movable gate section for moving said light deflecting element into cooperative relation to said light and the aperture in said fixed gate section upon the movement of the movable gate section into said cooperative relation with said fixed section whereby when said movable gate section is disposed in such cooperative relation to said fixed gate section light from said source is directed to the aperture of said gate.

18. In a film handling apparatus, in combination, a support, a gate having an apertured fixed section and a movable section disposable in film feeding position against said fixed gate section, said gate being mounted upon one side of said support and extending therefrom in a direction normal thereto, a pivotal mounting member for said movable gate section about which it may be moved away from said fixed gate section to open position, the axis of said mounting member being normal to said support, a source of light mounted upon the side of said support other than that upon which said gate is mounted for directing light in a direction normal to said support, means on said movable gate section for deflecting light from said source and through the aperture in said fixed gate section, and a light reducing shield mounted for movement with said mounting member as said mounting member is moved from said film feeding position to said open position to a position within the path of light from said source to said aperture whereby said light is reduced when said gate is opened.

19. In a motion picture projector, an apertured gate through which a film travels, a source for passing light to the aperture of said gate for the purpose of projecting pictures from the film traveling therethrough, and means for concomitantly reducing the light from said source reaching the aperture of said gate and for directing light from said source to parts of said gate relatively remote from said aperture whereby the film is protected from the heat of said light source and light is furnished to assist in a film manipulating operation.

20. In a motion picture projector, an openable apertured gate through which a film travels, a source for passing concentrated light to the aperture of said gate for the purpose of projecting pictures from the film traveling therethrough, and means rendered operative by the opening of said gate for passing light through an indirect path from said source to said gate, for the purpose of assisting in a film manipulating operation, and concomitantly preventing the main body of light from reaching the film in concentrated form, for the purpose of preventing damage thereto by heat during such operation.

21. In a motion picture projector, an openable apertured gate through which a film travels, a source for passing concentrated light to the aperture of said gate for the purpose of projecting pictures from the film traveling therethrough, means creating an indirect path for directing light from said source to said gate for the purpose of assisting in a film manipulating operation, and means operatively interconnected with said openable gate for reducing the power of the light from said source which is passed to said gate when said gate is open.

22. In a film handling apparatus, a continuously moving film support, an intermittent feeding member for feeding a film in relation to said continuous support, a gate positioned between said continuous support and said feeding member through which the film passes, said gate comprising a fixed section and a section movable relatively thereto, and means for compensating for the difference of character of movement of said continuous support and said feeding member and for maintaining a predetermined condition of tension in a section of the film between said gate and said support, said compensating means comprising a resilient curved member mounted upon said movable section at one extremity thereof and bodily movable therewith and extending therefrom toward said support, said resilient member and said gate providing a substantially continuous film engaging and film tensioning surface while said movable section is in cooperative relation to said fixed section, the movement of said movable section away from said fixed section serving to release the tension upon the film between said continuous support and said intermittent feeding member.

23. In a film handling apparatus, a continuously moving delivery carrier, a continuously moving take-up carrier, a gate positioned between said carriers through which the film passes, said gate comprising a fixed section and a section movable relatively thereto, an intermittent feeding member positioned between said carriers for moving the film through said gate directly from said delivery carrier and toward said take-up carrier, and means for compensating for the difference in character of movement of said carriers and said feeding member and for maintaining tension in the entire length of film between said carriers, said compensating means comprising a resilient curved member mounted upon said movable gate section at one extremity thereof and bodily movable therewith and extending therefrom toward said delivery carrier and a resilient curved member mounted upon said gate at the other extremity thereof and bodily movable therewith and extending toward said take-up carrier, said resilient members and said gate providing a substantially continuous film engaging and film tensioning surface while said movable section is in cooperative relation to said fixed section, the movement of said movable section away from said fixed section serving to release the tension upon the entire length of film between said carriers.

24. In a film handling apparatus, in combination, a rewinding carrier, a take up carrier, a gate disposed therebetween, said gate comprising a fixed gate section and a gate section mounted for pivotal movement relative to said fixed gate section, means for intermittently feeding a film from said delivery carrier toward said take-up carrier, and film compensating and tensioning means mounted on said pivoted gate section for movement therewith and disposed when said pivoted gate section is in film feeding position to produce an angular formation in the film as it is moved by said feeding means from said rewinding carrier through said gate toward said take-up carrier and thereby create tension in the film between said carriers, said pivoted gate section being movable to a rewinding position wherein said film tensioning means is so disposed as to destroy said angular formation in the film whereby the tension in the film is released to facilitate the rapid rewinding thereof.

25. In a film handling apparatus, in combination, a support, a delivery carrier, a take-up carrier mounted adjacent said delivery carrier in substantially the same horizontal plane, said carriers being mounted upon said support and extending forwardly thereof, a gate including a fixed section and a pivoted section mounted upon said support between said carriers in a plane at substantially right angles to the line joining the axes of said carriers, said pivoted section being movable from a film feeding position, wherein it is disposed in cooperative relation to said fixed section, to a rewinding position, wherein it forms a horizontal bridge as a rewinding work path from one of said carriers to the other, said bridge extending across the valley between said reels, a resilient curved member mounted upon said gate at one extremity thereof and extending therefrom toward said delivery carrier, and a resilient curved member mounted upon said gate at the other extremity thereof and extending toward said take-up carrier, said resilient members and said gate providing a substantially continuous film engaging and film tensioning surface, a feeding member disposed on the outside face of said front plate for feeding the film from said delivery carrier to said take-up carrier, a motor mounted upon said support, and connective mechanism between said motor and said delivery carrier for driving said delivery carrier in a rewinding direction, for rewinding the film across said bridge when said pivoted gate section is disposed in said rewinding position.

WARREN DUNHAM FOSTER.